United States Patent [19]

Maurer et al.

[11] Patent Number: 5,218,051
[45] Date of Patent: Jun. 8, 1993

[54] OPTICALLY ISOTROPIC BLENDS OF STYRENE/ACRYLONITRILE AND METHYL METHACRYLATE/GLUTARIMIDE COPOLYMERS

[75] Inventors: Brian R. Maurer; Mitchell G. Dibbs, both of Midland, Mich.

[73] Assignee: The Dow Chemical Company, Midland, Mich.

[21] Appl. No.: 580,022

[22] Filed: Sep. 10, 1990

[51] Int. Cl.$^5$ .................. C08L 25/04; C08L 25/12; C08L 33/12
[52] U.S. Cl. ........................ 525/221; 525/238; 525/222; 525/227; 525/241; 525/205
[58] Field of Search ............ 525/327.6, 221, 222, 525/227, 238, 241, 205

[56] References Cited

U.S. PATENT DOCUMENTS

| | | | |
|---|---|---|---|
| 4,217,424 | 8/1980 | Weese et al. | 525/67 |
| 4,246,374 | 1/1981 | Kopchik | 525/329 |
| 4,254,232 | 3/1981 | Mueller | 525/67 |
| 4,415,706 | 11/1983 | Staas | 525/183 |
| 4,436,871 | 3/1984 | Staas | 525/64 |
| 4,727,117 | 2/1988 | Hallden-Abberton et al. | 525/327.6 |
| 4,954,574 | 9/1990 | Hallden-Abberton et al. | 525/327.6 |

FOREIGN PATENT DOCUMENTS 0926269  5/1963  United Kingdom ............ 525/327.6

OTHER PUBLICATIONS

Concise Chemical and Technical Dictionary, edited by M. Bennett, 1947, p. 684. Chem. Pub. Co. Inc.
Rohm & Haas, Paraloid ® EXL-4000 Series (May 17, 1980).

Primary Examiner—James J. Seidleck
Assistant Examiner—W. R. H. Clark

[57] ABSTRACT

Optically isotropic blends comprising styrene/acrylonitrile copolymers containing from 18 to 32 percent acrylonitrile and methyl methacrylate/glutarimide resins containing from 10 to 50 weight percent methyl methacrylate and having stress optical coefficient of between −500 Brewsters and +500 Brewsters are usefully employed in the preparation of molded objects having reduced birefringence.

4 Claims, 1 Drawing Sheet

OPTICALLY ISOTROPIC BLENDS OF STYRENE/ACRYLONITRILE AND METHYL METHACRYLATE/GLUTARIMIDE COPOLYMERS

The present invention relates to blends of two resins which are optically isotropic. More particularly the present invention relates to such a blend of the two components in amounts such that the blend achieves reduced birefringence. Such optically isotropic polymeric blends are ideally suited for use in the preparation of optical lenses, instrument housings, glazing and similar devices where reduced birefringence is desired.

Birefringence in polymers that are otherwise optically clear may cause diffraction patterns under certain lighting conditions due to the fact that molded objects made from such polymers may have different degrees of stress throughout the molded object. The differing degrees of stress cause relative polarization of incident light and cancellation of certain wave lengths. Such an effect is considered undesirable particularly in applications such as automobile instrument cluster covers, plastic lenses, picture frame glazing, and other end uses.

U.S. Pat. No. 4,373,065 discloses optically isotropic devices made from blends of certain polymers. Suitable polymers disclosed for preparing such optically isotropic blends were polyphenylene oxide and polystyrene.

U.S. Pat. No. 4,436,871 discloses compositions comprising soluble or partly soluble blends of polyglutarimide and styrene acrylonitrile copolymers containing from 1 to 99 parts by weight polyglutarimide and from 99 to 1 parts by weight styrene acrylonitrile copolymer. Similar blends are also disclosed in U.S. Pat. No. 4,727,117. Although disclosing the miscibility of polyglutarimide and styrene acrylonitrile copolymers, the references fail to disclose combinations of the resins that are also optically isotropic.

Polyglutarimides are disclosed in U.S. Pat. No. 4,246,374. Modifications of the polyglutarimides are further disclosed in U.S. Pat. Nos. 4,254,232 and 4,217,424.

According to the present invention there is provided a substantially isotropic blend comprising a styrene/acrylonitrile copolymer containing from 18 to 32 weight percent acrylonitrile and a miscible copolymer comprising methyl methacrylate and glutarimide, the amount of styrene/acrylonitrile copolymer in the blend being from 27 to 45 weight percent and the amount of methyl methacrylate/glutarimide copolymer being from 73 to 55 weight percent.

DETAILED DESCRIPTION

Figure 1:
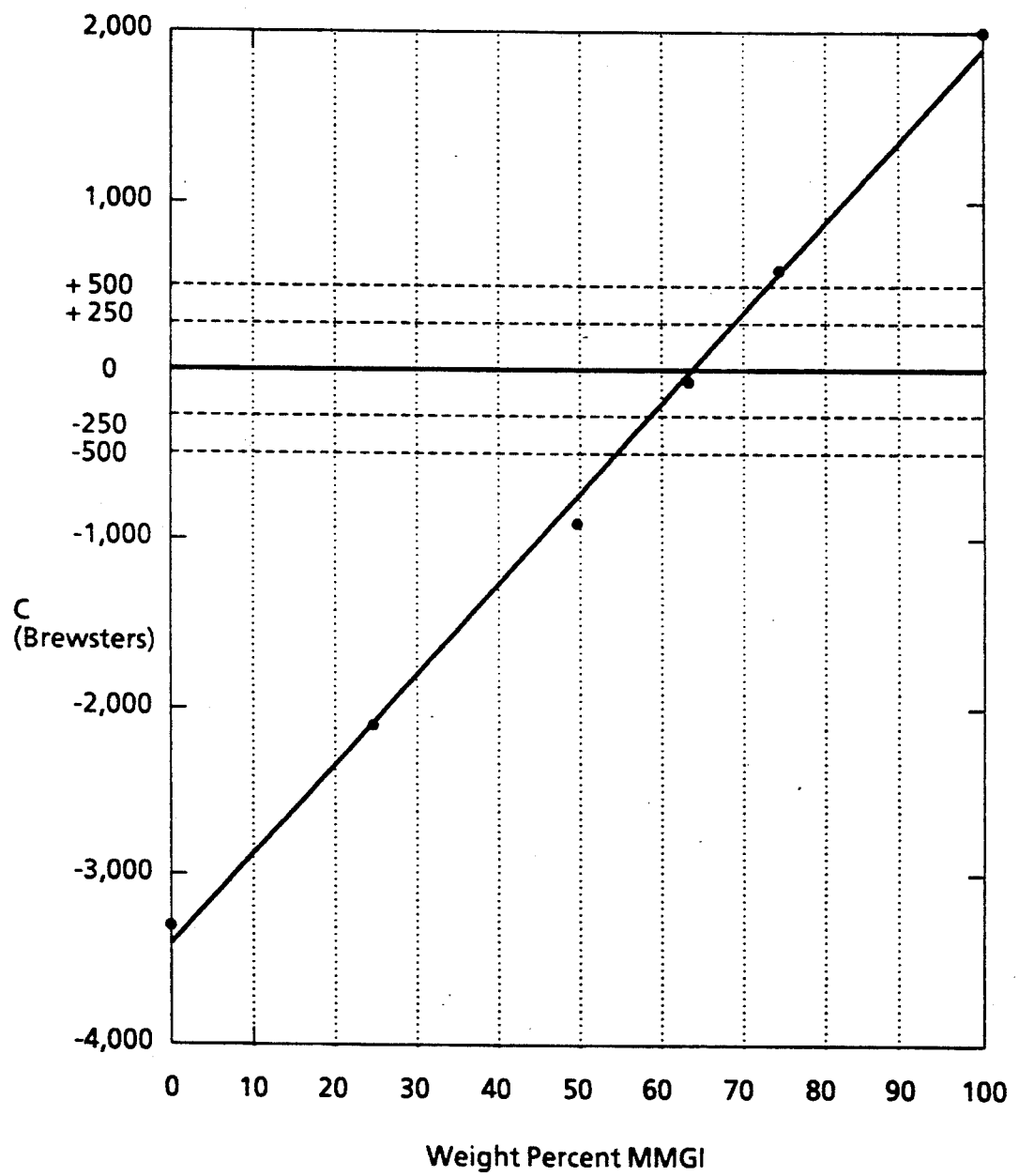
FIG. 1 illustrates the polymer stress optic coefficient in Brewsters for blends of a styrene/acrylonitrile copolymer and a methyl methacrylate/N-methyl-2,4-dimethylglutarimide copolymer in varying proportions.

By the term "substantially isotropic" is meant a polymer possessing a stress optic coefficient, C, as measured according to ASTM 4093 of between −500 and +500, more preferably between −250 and +250 Brewsters.

Styrene/acrylonitrile copolymers for use according to the present invention include copolymers of styrene itself and substituted styrenes, especially α-methylstyrene or $C_{1-4}$ ring or halo-substituted styrenes. Additional monomers such as alkyl methacrylate, acrylates, imides and N-alkyl or aryl substituted imides may also be included if desired. A preferred polymer consists essentially of 80 to 70 percent styrene and 20 to 30 percent acrylonitrile by weight and has a negative stress optic coefficient. At higher and lower levels of acrylonitrile than herein specified the copolymer is not miscible with the methyl methacrylate/glutarimide copolymer. The methyl methacrylate/glutarimide copolymer includes 2,4-dimethyl glutarimide and N-substituted glutarimide containing copolymers, i.e., copolymers comprising moieties corresponding to the formula:

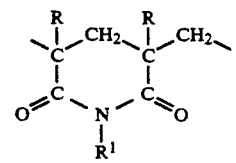

wherein R is hydrogen or methyl and $R^1$ is hydrogen or a $C_{1-20}$ alkyl, cycloalkyl or aryl group. Preferred are N-methyl-2,4-dimethyl glutarimide containing polymers. In addition to methyl methacrylate and glutarimide, such copolymers may also include additional monomers such as $C_{2-12}$ alkyl or cycloalkyl methacrylate moieties, styrene, and $C_{1-12}$ alkyl or cycloalkyl acrylate moieties. A preferred copolymer consists essentially of from 10 to 50 weight percent methyl methacrylate and 90 to 50 weight percent N-methyl-2,4-dimethyl glutarimide and has a positive stress optic coefficient.

Because the respective contents of styrene and acrylonitrile in the styrene/acrylonitrile polymeric component of the present blend and of methyl methacrylate and glutarimide in the other component of the present polymeric blend may vary, and because the presence or absence of a substituent on the nitrogen of the maleimide will effect the anisotropy of the methyl methacrylate/glutarimide copolymer, the exact ratio of the two components required to produce an optically isotropic blend will vary slightly within the afore-mentioned range. In addition, for many applications an acceptable polymer may possess a certain degree of anisotropy. For example, in many applications where stress in the resulting object is able to be controlled, the artisan need not utilize a polymer having stringent low birefringence. More preferably the amount of styrene/acrylonitrile copolymer in the blend is from 31 to 42 weight percent and the amount of methyl methacrylate/glutarimide copolymer is from 69 to 58 weight percent, and the resulting polymeric blend has a stress optic coefficient between −250 and +250 Brewsters.

Having described the invention the following example is provided as further illustrative and is not to be construed as limiting. Unless stated to the contrary percentages are expressed by weight.

A polymer blend was made with a methyl methacrylate/N-methyl-2,4-dimethyl glutarimide polymer (MMGI) containing approximately 40 percent methyl methacrylate and 60 mole percent N-methyl-2,4-dimethyl glutarimide moieties (XHTA 50 available from Rohm & Haas Company) and a styrene/acrylonitrile (SAN) copolymer containing 25 percent by weight acrylonitrile (Tyril ™ 1000B available from The Dow Chemical Company). The glutarimide containing polymer had a stress optic coefficient, C, of +2000 Brewsters (1 Brewster=$10^{-12}$ Pascals$^{-1}$). The SAN had a stress optic coefficient of −3300 Brewsters. Blends with a SAN content of 25 percent, 35 percent, 50 percent, and 75 percent were made by dissolving the required amount of each polymer (150 g total weight) in 1 L of dichloromethane. The polymer blend was precipitated in 8 L of methanol and collected by vacuum filtration. The blend was devolatilized in a vacuum oven at 150° C./30 mm Hg for 2.5 hours. The blend was then compression molded at 230° C. to form clear disks. The stress optic coefficients of the blends were measured using an Instron 3400 tensile load frame equipped with a high temperature environmental chamber. The chamber was equipped with a water spray device to quench the samples without allowing the orientation to relax. Compression molded samples were cut into bars 8 cm by 3 cm. The polymer samples was mounted in the frame, and the environmental chamber was allowed to equilibrate at a temperature approximately 20 degrees above the glass transition temperature (Tg) of the blend. The temperature of the chamber was measured with a thermocouple placed near the sample. After allowing the sample to equilibrate at temperature for approximately thirty minutes, the sample was extended up to 400 percent. Once final extension was reached, the crosshead was stopped and the water spray was triggered to quench the sample to a temperature below the Tg of the blend. The sample was dismounted and the final width and thickness of the sample were measured at a point midway in the gage. The true stress is taken as the load just prior to triggering of the water spray divided by the sample cross-sectional area. The birefringence of the quenched sample was measured by the technique of ASTM 4093. The birefringence of a minimum of three to five samples was plotted versus the true stress. The stress optic coefficient of the polymer was taken as the slope of a line extending from the origin through the data obtained on the above samples. Results are contained in Table I. The stress optic coefficient versus composition is shown in FIG. 1. The 36 percent SAN/64 percent MMGI sample is a working example of an optically isotropic resin blend according to the present invention.

TABLE I

| Weight % SAN | Weight % MMGI | Tg (°C.) | C (Brewsters) |
| --- | --- | --- | --- |
| 0 | 100 | 149 | +2000 |
| 25 | 75 | 136 | +600 |
| 36 | 64 | 133 | −60 |
| 50 | 50 | 123 | −900 |
| 75 | 25 | 119 | −2100 |
| 100 | 0 | 111 | −3300 |

What is claimed is:

1. A substantially isotropic thermoplastic blend possessing a stress optic coefficient, C, as measured according to ASTM 4093 of between −500 and +500 Brewsters comprising a styrene/acrylonitrile copolymer containing from 18 to 32 weight percent acrylonitrile and a miscible copolymer comprising methyl methacrylate and glutarimide, the amount of styrene/acrylonitrile in the blend being from 27 to 45 weight percent and the amount of methyl methacrylate/glutarimide copolymer being from 73 to 55 weight percent.

2. A blend of claim 1 comprising from 31 to 42 weight percent styrene/acrylonitrile copolymer and from 69 to 58 weight percent methyl methacrylate/glutarimide copolymer, and having a stress optic coefficient of between −250 Brewsters and +250 Brewsters.

3. A blend of claim 1 wherein the methyl methacrylate/glutarimide copolymer contains glutarimide moieties corresponding to the formula:

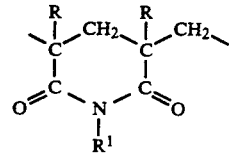

wherein R is hydrogen or methyl and $R^1$ is hydrogen or a $C_{1-12}$ alkyl, cycloalkyl or aryl group.

4. A molded object comprising the thermoplastic blend of claim 1.